No. 860,916. PATENTED JULY 23, 1907.
F. G. HARRISON.
FODDER CUTTER.
APPLICATION FILED SEPT. 11, 1905.

4 SHEETS—SHEET 1.

WITNESSES
Jos. J. Hosler
Obed B. Billman

INVENTOR
Frank G. Harrison,
BY
Harry Frease
ATTORNEY

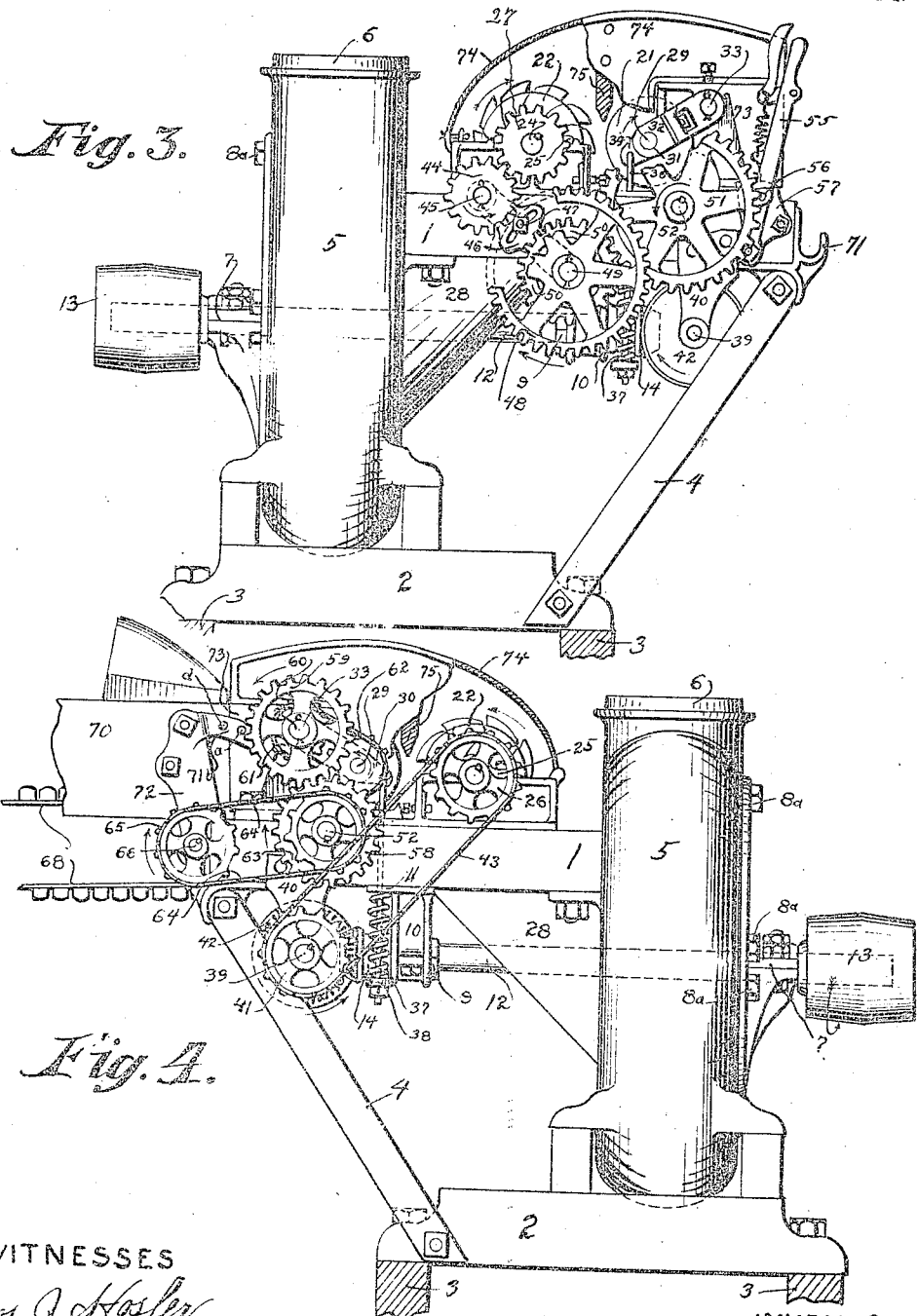

No. 860,916.  
PATENTED JULY 23, 1907.  
F. G. HARRISON.  
FODDER CUTTER.  
APPLICATION FILED SEPT. 11, 1905.

4 SHEETS—SHEET 3.

WITNESSES  
Jos. J. Hosler.  
Fred B. Billman.

INVENTOR  
Frank G. Harrison,  
BY  
Harry Frease.  
ATTORNEY

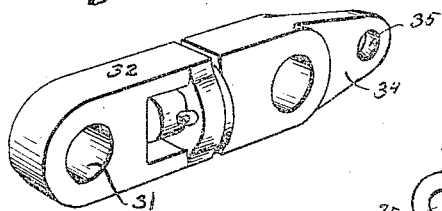
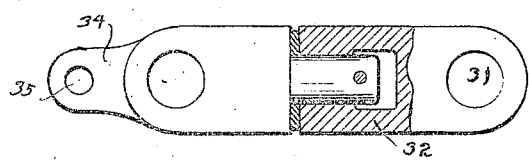
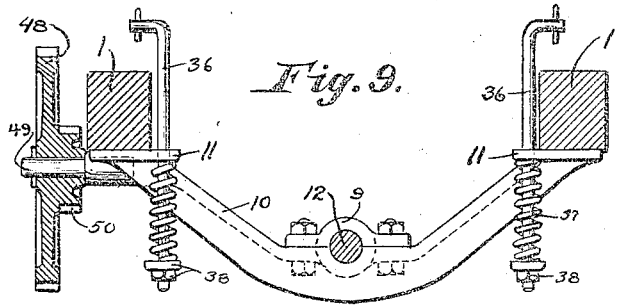
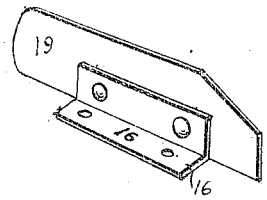
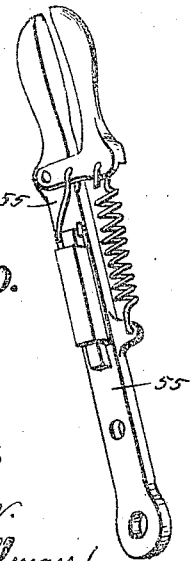
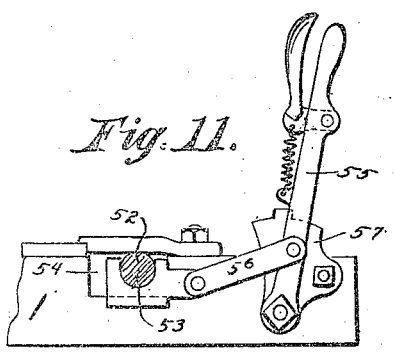

UNITED STATES PATENT OFFICE.

FRANK G. HARRISON, OF MASSILLON, OHIO, ASSIGNOR TO WILLIAMSON R. HARRISON, OF MASSILLON, OHIO.

FODDER-CUTTER.

No. 860,916.  Specification of Letters Patent.  Patented July 23, 1907.

Application filed September 11, 1905. Serial No. 277,823.

*To all whom it may concern:*

Be it known that I, FRANK G. HARRISON, a citizen of the United States, residing at Massillon, in the county of Stark and State of Ohio, have invented certain new and useful Improvements in Fodder-Cutters, of which the following is a specification.

The invention relates to improvements in fodder cutters and particularly to that class of cutters in which there is mounted in front of a pair of feeding rolls—and a stationary cutting bar, a cutting cylinder comprising a series of spirally arranged arms carrying knives or cutters adapted to cut and disentegrate the material as it is fed over and in front of said stationary cutting bar.

The general object of the invention is to produce a generally improved device of this class in compact form adapted to insure a proper feeding and the ready and quick discharge of the cut and disentegrated material as received from the cutting cylinder.

In carrying out this object, I provide a pneumatic blower or fan mounted transversely in front of, and below the cutting-cylinder, and provided at its rear with a chute adapted to receive the cut and disintegrated material and convey the same to the blower or fan whereby the same is discharged.

Another purpose of the invention is to provide a readily detachable connection of the feeding-trough with the machine, proper.

Further objects and advantages of the invention will appear from the following description taken in connection with the accompanying drawings forming a part of this specification.

Figure 1:
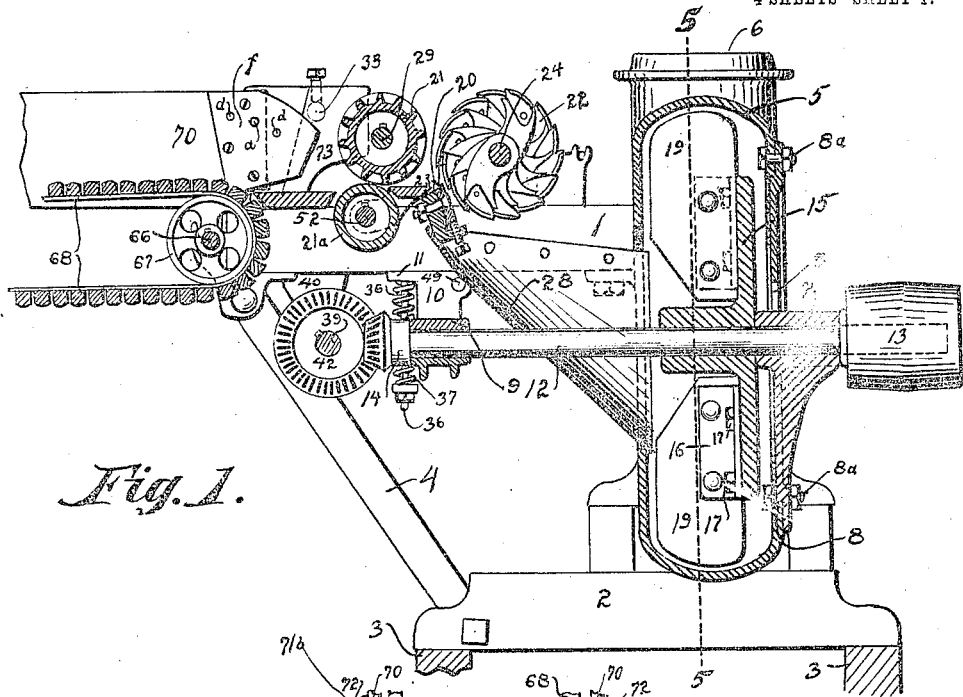
Figure 2:
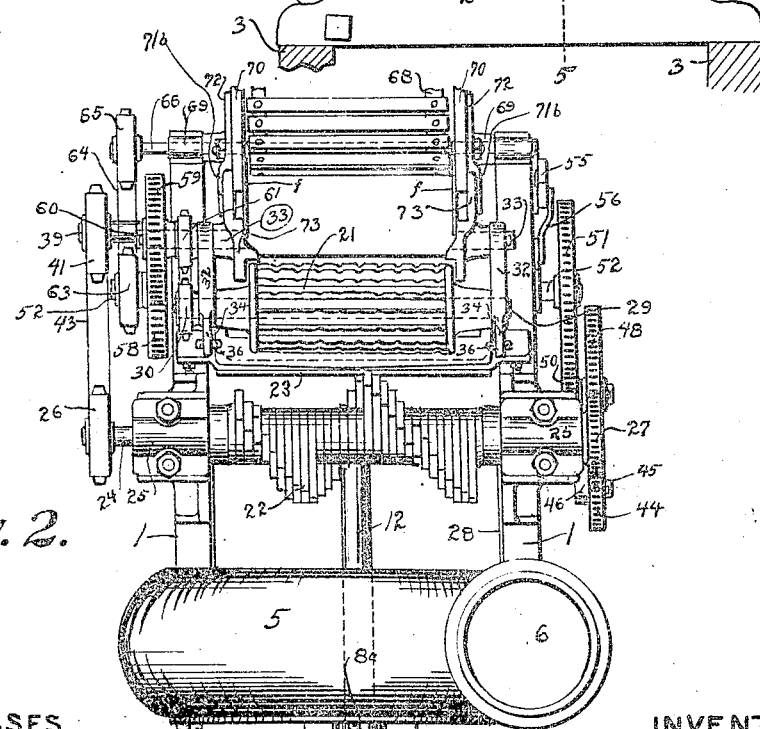
Figure 5:
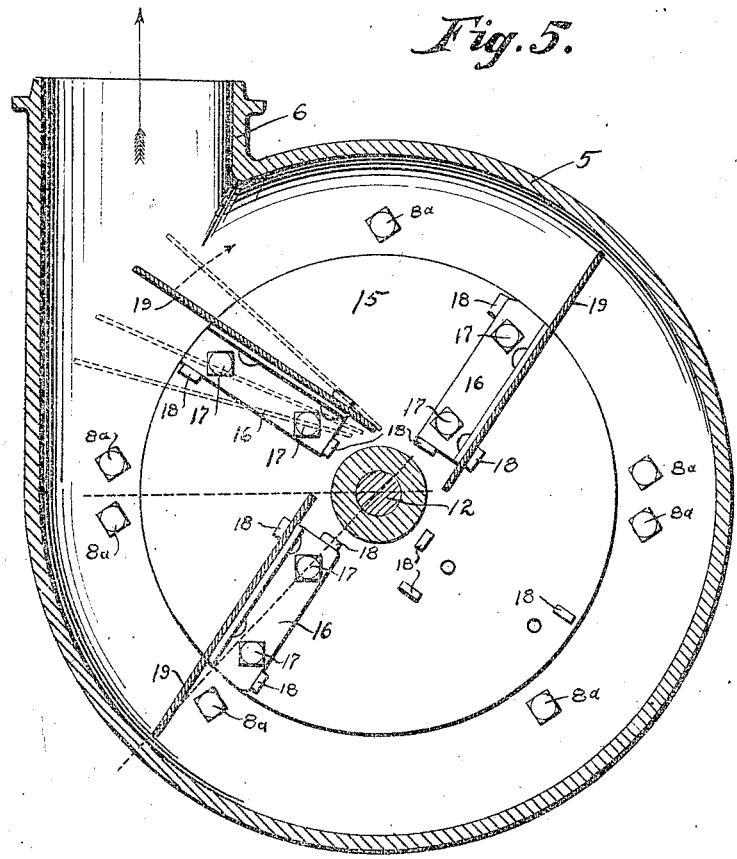
Figure 6:
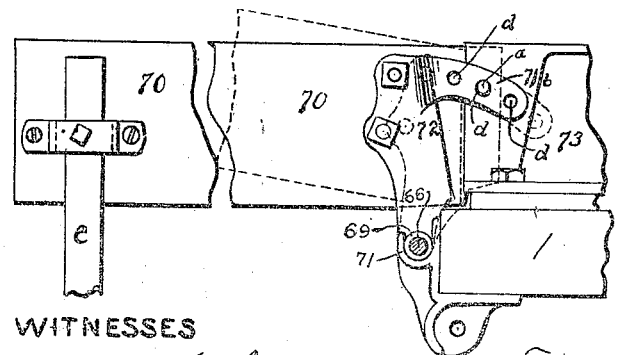

Referring now to the drawings, Figure 1 is a vertical sectional view of the improved cutter; Fig. 2, a plan view of the same; Fig. 3, a left side view of the same, partly in section; Fig. 4, a right side view of the same, partly in section; Fig. 5, a sectional view of the fan or blower taken through line 5—5, of Fig. 1; Fig. 6, a right side view of the feeding-trough showing its mode of attachment to the machine; Fig. 7, a detailed perspective view of one of the swiveled compression-arms of one of the feeding-cylinders; Fig. 8, a side view of the same, partly in section; Fig. 9, a detail view of the depending bracket, attached to upper side arms of frame of machine and adapted to carry one end of the driving shaft of the fan or blower; Fig. 10, a perspective view of the operating lever for throwing feed - mechanism into and out of operation; Fig. 11, a side view of the same showing its connections with the movable bearing attached to one of the upper side arms of frame of machine; and Fig. 12, a detached perspective view of one of fan-blades and its attached angle bar.

Similar numerals of reference indicate like parts throughout all the figures of the drawings.

Referring now to the drawings, 1, designates the upper side arms of the frame of the machine, and 2, designates the lower side arms of same, supported upon the base beams 3 and connected to said upper side arms 1, by means of brace-arms 4, secured thereto in any suitable and convenient manner. The blower-case 5 incloses the fan and is mounted transversely upon the lower side arms 2, in any suitable and convenient manner, and is provided at its side with an upwardly-extending discharge-pipe 6. A bearing 7, for the fan-shaft, is mounted within an opening 8, formed in the side of the blower-case 5, and is secured to said blower-case 5, by means of a series of bolts $8^a$, passing through openings formed about the periphery of said opening 8. A second bearing 9, is formed upon the depending bracket 10, and which bracket has its ends secured beneath the upper side arms 1, hereinbefore referred to, said ends being provided with the flanges or guides 11. The driving-shaft 12 of the fan or blower is mounted longitudinally of the machine in the bearings 7, and 9, and carries upon one end a driven-pulley 13, and upon the other a bevel-gear 14. The fan-disk 15, is mounted and secured to the driving-shaft 12, in any suitable and convenient manner and carries a series of supporting-angle-arms 16, secured to the fan-disk 15, by means of bolts 17, and is further supported by means of lugs 18, formed integral with the fan disk 15.

A series of paddle blades or fans 19, are secured to the supporting-angle-arms 16, in any suitable and convenient manner, but disposed rearwardly at an angle to a line drawn at right angles to the line of rotation of the fan. This is a very important part and principle in the construction of fans or blowers of this class, as it has been found in practice that where the fans or paddles are radially disposed in the usual manner, at right angles to the line of travel in rotating, there is a tendency to carry the material past the upwardly-extending discharge-pipe 6, whereby the material is carried about with the fan, clogging the same, and preventing the same from performing its proper function. This tendency is not so evident where the discharge-pipe is at the lower portion of the blower-case and when the discharge-pipe does not extend upwardly, as in these instances the force of gravity does not so strongly oppose the centrifugal force caused by the rotation of the fan.

Where the discharge pipe is disposed as herein shown and described, I accelerate the centrifugal force by disposing the blades or fans 19 as herein shown and described.

The usual stationary cutting bar 20, is disposed transversely in front of the feed-rolls 21, and $21^a$, and near the periphery of the cutting-cylinder 22. Near the upper front edge of said cutting-bar there is provided an adjustably mounted and secured blade or bar 23, presenting a shear-edge adjacent to the periphery of the cutting-cylinder 22.

The cutting cylinder 22, is formed or attached on a driving-shaft 24, mounted forward from and parallel with the cutting-bar and preferably in suitable bearings 25, secured to the upper side of the arms 1, and the driving-shaft 24, is provided at one end with a sprocket-wheel 26, and at the other end with a gear-wheel 27. As said cutting-cylinder 22, is revolved, the cut and disintegrated material is caught and carried forward to the fan or blower, by means of a downwardly and forwardly extending chute 28, disposed between said cutting-bar 20, and cutting-cylinder 22, and the fan or blower.

The chute is adapted to convey the material to the fan or blower in the most natural and direct manner without any diversion or check in the momentum given by the cutting stroke of the cylinder, and there is less liability to clog than when the material is carried to the side as in the machines now in common use, wherein the blower is located at one side or the other of the machine. It will be understood that the great force required for elevating ensilage to the top of high silos is not practically given by the blowers of comparatively small diameter which have heretofore been used on machines of this character, and which have their axes located parallel with the axes of the cutting-bar and cylinder and not in a plane perpendicular thereto, as shown and described in this improvement.

The upper feed-roll 21, is mounted upon a shaft 29, carrying upon one of its ends a sprocket-wheel 30, and the shaft 29, is carried by and has its ends journaled in bearings 31, in the free ends of a pair of compression-arms 32, composed of sections, one swiveled with relation to the other, the compression arms being at one end pivotally mounted in a loose manner, upon a pair of trunnions or pivots 33, secured to the upper side-arms 1, of the machine. The short arms 34 formed on the free ends of said compression-arms 32, are provided with eyes 35, adapted to receive and take over the ends of a pair of vertically-arranged spring-compressed rods 36, extending through the brackets or guides 11, hereinbefore referred to, and carry upon their lower ends a pair of coil-springs 37, supported and carried by a washer and nut 38, mounted upon the lower ends of said arms 36. By these means, the upper feed-roll 21, is yieldingly compressed upon the material fed beneath the same, and should a greater bulk or quantity of material be fed upon one side of the feeding-box than the other, the spring-compressed rods 36, together with the swiveled compression-arms 32 will allow one side of the feed-roll 21, to be raised higher than the other and thus conform to the volume and form of the material being fed.

A shaft 39 is mounted in a pair of depending-brackets 40, and carries upon one end a sprocket-wheel 41, and at the other a bevel-gear 42, meshing with the bevel-gear 14, of the driving-shaft 12, hereinbefore referred to.

43 designates a sprocket-chain, by means of which power is transmitted from sprocket-wheel 41 to sprocket-wheel 26, and the shaft 24, carrying the cutting-cylinder 22, is revolved.

A gear-wheel 44, meshing with gear-wheel 27, is mounted upon a trunnion 45, carried upon the end of an adjustably-mounted bracket 46, secured to one of the upper side arms 1, by means of an adjusting-bolt and nut 47, and by means of the bracket 46, the gear-wheel 44, may be thrown out of mesh or engagement with the adjacent gear-wheel 27.

A gear-wheel 48, meshing with the gear-wheel 44, is mounted upon a trunnion or pivot-pin 49 (see Fig. 9) secured to the underside of one of the upper side arms 1, of the machine. A smaller gearing 50, is formed on the inner side of gear-wheel 48 and is preferably made an integral part thereof. The smaller gearing 50, meshing with another gear-wheel 51, of larger diameter, is mounted upon a shaft 52, carrying the lower feed-roll 21ᵇ, hereinbefore referred to.

A movable bearing 53, (see Fig. 11,) is slidably-mounted in a recess 54, formed in the upper side of the side arms 1, of the frame of the machine, and said bearing takes over the shaft 52, upon the side adjacent to the gear-wheel 51, and is adapted to shift the same longitudinally of the machine by means of the operating-lever 55, connected to said movable bearing 53 by means of a connecting link 56. The operating-lever 55, is pivotally secured to the side of a bracket 57, secured to the side arm 1, in any suitable and convenient manner.

It will thus be seen that by shifting the operating-lever 55, the shaft 52, may be moved longitudinally whereby the gear-wheel 51, will be thrown out of mesh or engagement with the smaller gearing 50, whereby the feeding-mechanism may be stopped while the cutting-cylinder and discharging-mechanism remain in full operation.

A gear-wheel 58, is mounted upon the shaft 52, carrying the lower feed-roll 21ᵇ and the gear-wheel 58, meshes with a gear-wheel 59, mounted on a trunnion 60, and has upon its inner side the preferably integral sprocket-wheel 61, carrying a sprocket-chain 62, which passed over sprocket-wheel 30, whereby the upper feed-roll 21, is revolved.

A sprocket-wheel 63 is mounted upon the end of shaft 52, and carries a sprocket-chain 64, which passes over a second sprocket-wheel 65, mounted upon the end of a shaft 66, suitably mounted, and carrying a roller 67, over which passes an endless carrier or conveyer 68 adapted to convey the material to the feed-rolls.

It will be observed that the shaft 66, is mounted in suitable bearings or sleeves 69, mounted near the ends of the feeding-trough 70, and that the feeding-trough 70, is secured to the main frame 1, of the machine by dropping said bearings or sleeves 69, into the upwardly extending hooks 71, secured to the ends of the main frame 1, and adapted to take over and form a seat for the same. When said feeding-trough 70 has been elevated to a horizontal position, a bolt, as at "a", may be passed through openings "d" formed in the elongated ear or lug 71ᵇ, formed on the bracket 72, secured to front of feeding-trough and through the adjacent side-board 73, of the machine. The other or free end of said feeding-trough 70, may be supported by vertical legs "e" or other suitable and convenient means.

When it is desired to disengage the feeding-trough from the main frame, a detachable link of the sprocket-chain 64, is opened and the bearings 69, are lifted from the hooks 71, and the feeding-trough laid aside as desired. A pair of plates "f" are mounted and secured to the ends of the feeding-trough 70, within the sides thereof and are adapted to cover the recess between the sides of the pivoted end of the feeding-trough and the adjacent sides of the machine. The rear or free end of the feeding-trough may be adjusted up and down and secured in the position desired by passing the bolt, as at "a", through one of the openings "d" of the elongated ear or lug and through the adjacent side-board of the machine. By these means the feed-trough can be given any desired inclination without interfering in any way with the operation of the endless conveyer bottom and its gear connections. A cap 74, takes over the feeding and cutting cylinders, and a depending-board 75 is secured within said cap 74, and is designed to prevent material from passing over the upper feed-roll.

From the foregoing description, taken in connection with the accompanying drawings, the operation and advantages of the invention will be readily understood.

Having thus described the invention, without having attempted to set out all the forms in which it may be made or all the modes of its use, I declare that what I claim and desire to secure by Letters Patent, is—

1. The combination of a fodder-cutter having a feed-trough in its rear end and a transversely-located cutter-bar and a cutting-cylinder in front thereof in its forward end, a pneumatic-blower mounted in front of the cutting-cylinder and being on an axis longitudinal of the machine as a whole, and a chute inclined downward and forward from the cutter-bar to the blower.

2. In a fodder cutter, a frame, a pair of longitudinally located arms composed of sections, one swiveled in relation to the other, the arms being loosely pivoted at one end to the sides of the frame, controlling springs connected to the frame and to the arms, and a pair of feed-rolls mounted transversely on the frame, one of said rolls being journaled in the frame and the other roll being journaled in the free ends of the arms.

3. In a fodder-cutter, the combination with the lower feed-roll, suitable gearing for operating the same, and means for moving one end of said lower feed-roll, whereby the same may be thrown into and out of gear with said gearing; of an upper feed-roll mounted upon a shaft, a pair of swiveled compression-arms pivotally mounted and having their free ends taking over the ends of said shaft, a pair of vertically arranged spring-compression arms engaging the free ends of said compression-arms, and gearing connecting said upper and lower feed-rolls.

In testimony whereof I have signed my name to this specification in the presence of two subscribing witnesses.

FRANK G. HARRISON.

Witnesses:
HOWARD P. HARRISON,
HARRY FREASE.